(12) United States Patent
Kinser et al.

(10) Patent No.: US 7,822,974 B2
(45) Date of Patent: Oct. 26, 2010

(54) IMPLICIT TRUST OF AUTHORSHIP CERTIFICATION

(75) Inventors: Stephen Hugh Kinser, Saratoga Springs, UT (US); Lloyd Leon Burch, Payson, UT (US); Cameron Craig Morris, Saratoga Springs, UT (US)

(73) Assignee: Novell, Inc., Provo, UT (US)

( * ) Notice: Subject to any disclaimer, the term of this patent is extended or adjusted under 35 U.S.C. 154(b) by 1199 days.

(21) Appl. No.: 11/433,961

(22) Filed: May 15, 2006

(65) Prior Publication Data

US 2007/0266249 A1 Nov. 15, 2007

(51) Int. Cl.
H04L 29/06 (2006.01)

(52) U.S. Cl. ................ 713/156; 713/155; 713/157; 705/59

(58) Field of Classification Search ................ 713/157
See application file for complete search history.

(56) References Cited

U.S. PATENT DOCUMENTS

| | | | |
|---|---|---|---|
| 5,687,235 A | 11/1997 | Perlman et al. | |
| 6,098,056 A | 8/2000 | Rusnak et al. | |
| 6,134,327 A | 10/2000 | Van Oorschot | |
| 6,134,550 A | 10/2000 | Van Oorschot et al. | |
| 6,304,974 B1 | 10/2001 | Samar | |
| 6,510,513 B1* | 1/2003 | Danieli | 713/156 |
| 6,816,900 B1* | 11/2004 | Vogel et al. | 709/225 |
| 2003/0182549 A1 | 9/2003 | Hallin et al. | |
| 2003/0217275 A1* | 11/2003 | Bentley et al. | 713/184 |
| 2005/0132202 A1* | 6/2005 | Dillaway et al. | 713/179 |
| 2005/0183142 A1* | 8/2005 | Podanoffsky | 726/18 |
| 2005/0257271 A1* | 11/2005 | Lafornara et al. | 726/26 |
| 2006/0047949 A1* | 3/2006 | Brown et al. | 713/156 |
| 2006/0230461 A1* | 10/2006 | Hauser | 726/27 |
| 2007/0162752 A1* | 7/2007 | Baliga et al. | 713/169 |
| 2008/0104406 A1* | 5/2008 | Pravetz et al. | 713/176 |

* cited by examiner

Primary Examiner—Matthew B Smithers
(74) Attorney, Agent, or Firm—Schwegman, Lundberg & Woessner, P.A.

(57) ABSTRACT

Techniques for establishing implicit trust of authorship certification are provided. A message's domain is validated in response to a valid domain certificate. A message's author is validated in response to an author identification, which is acquired from the message and which is supplied to a domain service of the author. The domain service is implicitly trusted based on the domain being validated via the domain certificate. The domain service uses the author's identification to traverse to a specific location within the domain that houses an author certificate for the author. The author certificate is compared against a message certificate that accompanies the message in order to establish trust with the author and the author's message.

23 Claims, 4 Drawing Sheets

IMPLICIT TRUST OF AUTHORSHIP CERTIFICATION

FIELD

The invention relates generally to security and more particularly to techniques for establishing implicit trust of authorship certification.

BACKGROUND

With the ever expanding use of the Internet for a wide variety of economic and personal usages, there is an increasing need for improved and streamlined security techniques. That is, when a user or business conducts a transaction over the Internet by receiving or sending a message, the users and the businesses desire some assurances that the senders and recipients of the message are legitimate and who they purport to be.

For example, an individual may receive an email that purports to be from a friend or business associate when in fact the message may be a harmful virus, which if opened within the email system of the individual may cause significant harm to the individual's computing resources. To alleviate the concern, very profitable businesses have emerged on the Internet that offer services for purposes of authenticating or validating message senders or domains associated with those senders.

These services are often referred to as Certificate Authorities (CA's). A CA supplies a digital certificate for a domain or a sender for a fee. So, if an employee of a business receives an email message from a particular domain, the domain in question can be vouched for as being authenticated by consulting the CA. The CA supplies a certificate that the employee or the World-Wide Web (WWW) browser of the employee can use for subsequent interactions with the domain in question, and if the supplied certificate matches a certificate supplied with an email message, then this is an indication that the email message is legitimate.

One problem with the above-described scenario is that although owners of whole domains (e.g., Novell® owns Novell.com, etc.) often purchase and use domain certificates through a CA for their domains, those same owners do not typically purchase and use individual certificates for every employee or user included within their domains. This is so, because administering individual user-based certificates can be challenging and because the CA will charge for each issued certificate such that the cost can quickly become prohibitive for many enterprises and their users. Thus, generally enterprises will purchase and manage only a few domain-based certificates from a CA and will not attempt to purchase and manage individual certificates for each employee or user of the enterprises' domains.

Therefore, there is a need for techniques that permit the authenticity or trust of authors to be resolved without being required to have a CA-based or third-party based issued certificate for each user of a domain.

SUMMARY

In various embodiments, techniques for establishing implicit trust for authorship certification are presented. More specifically, and in an embodiment, a method for establishing trust of a message's authorship is provided. An identifier for an author is received; the identifier is received from a requestor in response to an attempted communication between the author and the requestor. A determination is made as to whether a storage location associated with the identifier exists, and when the storage location does not exist the requestor is notified that the author cannot be validated. An author certificate of the author is returned from the storage location, when it exists, and the author certificate is returned to the requester. The requestor uses the author certificate to establish implicit trust with the author for the attempted communication.

DETAILED DESCRIPTION

As used herein an "author" is a relative term that refers to an entity that originates an electronic message (e.g., instant message, electronic mail, text message, etc.). An author may simply forward or resend a message that the author did not create or the author may be the creator of the message being sent. The term author is relative because for any given transaction a participant may be designated as an author for one aspect of the transaction and a recipient or receiver for another aspect of the transaction. So, any entity that forwards or sends a message during a particular portion of a given transaction may be considered an author. Moreover, an "entity" may be considered a physical resource, such as a person, an organization, a group; alternatively, an entity may also be considered a logical resource, such as an automated service or a program.

A "trusted relationship" refers to communications between two or more entities that are authenticated and that are considered safe for interaction with. Trust is explicit when communications with a particular entity include a valid certificate for that particular entity. Trust is considered to be implicit for one entity when a valid certificate from the entity is acquired from another entity for which direct trust (direct or indirect) has already been established. In other words, assume entity A has explicit trust with R, such that a certificate for A is in the possession of R (the certificate of A obtained by R from a CA). So, if A is consulted about B (R asks A for a certificate of B) and if A supplies a valid certificate for B back to R, then the trust with B from the perspective of R is implicit because trust with A is explicit and the trust with B is acquired from A.

Communications in a trusted relationship may be secure, such as when they are encrypted or may be insecure, such as when there is no specific encryption used. Additionally, communications in a trusted relationship may use secure communications channels, such as secure sockets layer (SSL), etc., or communications may use insecure communication channels. However, the communications do include at least a digital certificate and perhaps a digital certificate associated with the author of any given particular communication.

Various embodiments of this invention can be implemented in existing network architectures. For example, in some embodiments, the techniques presented herein are implemented in whole or in part in the Novell® network and proxy server products, email products, identity service products, operating system products, and/or directory services products distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

Figure 1:
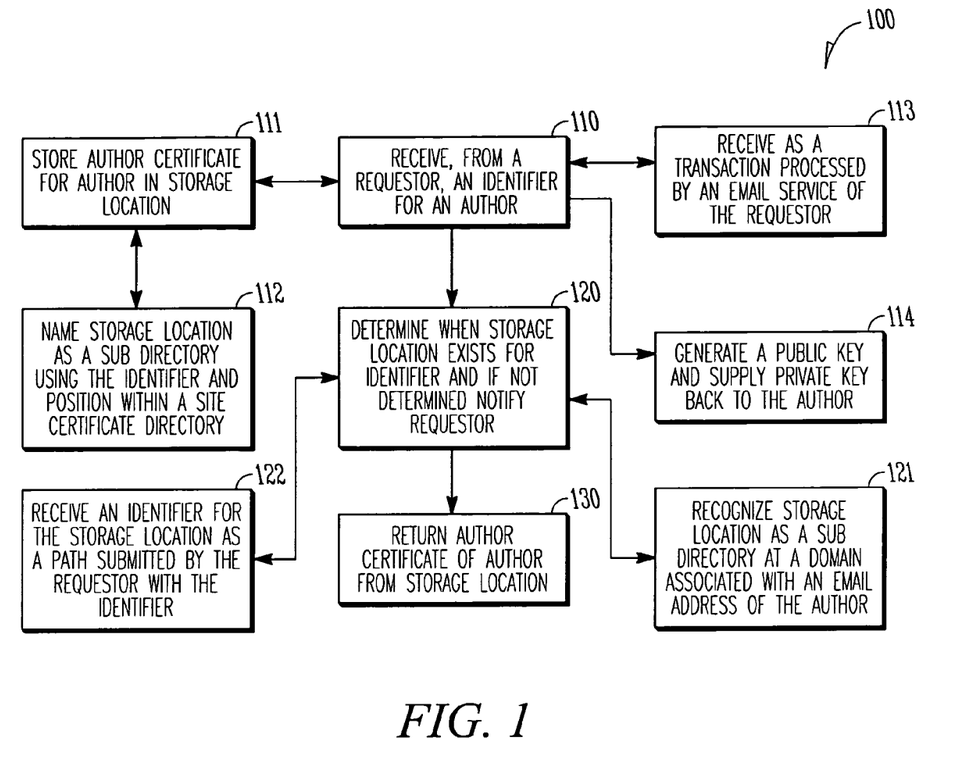
FIG. 1 is a diagram of a method for establishing authorship trust, according to an example embodiment.

FIG. 1 is a diagram of a method 100 for establishing authorship trust, according to an example embodiment. The method 100 (hereinafter "message trust service") is implemented in a machine-accessible and readable medium. The message trust service is operational over and processes within a network. The network may be wired, wireless, or a combination of wired and wireless.

According to an embodiment, the message trust service is implemented as a network service that processes within the domain of an author. That is, the message trust service may be viewed as a sub service of the author's domain. A recipient or requester of an author's message (e.g., email, instant message, text message, etc.) uses an enhanced feature of its message service (e.g., email system, instant messaging system, text messaging system, etc.) to interact with the message trust service for purposes of establishing implicit trust with the author and the message of the author. The trust is implicit because the domain associated with the author's message is explicitly authenticated or determined to be trusted and the message trust service is associated directly with the domain, such that if the message trust service vouches for an author and its message then the trust for that author and its message is implied or determined to be implicit. The operations that an enhanced messaging service may use to interact with the message trust service is described more completely below with the discussion of the method 300 and the FIG. 3.

Initially, the author (e.g., sender of a message for a particular portion of a communication transaction) sends a message (e.g., email, text message, instant message, etc.) to a recipient. The recipient receives metadata with that message, such as, but not limited to, an email address associated with the author (sender of the message).

For example, if an employee of Novell® named Cameron sends an email to an employee of SUSE® Linux named Lloyd, the metadata accompanying that message may include the email address of Cameron as Cameron@Novell.com. The first portion of that email address provides an identifier for an author, "Cameron" within the domain of "Novell.com." It is to be understood that other variations or techniques may be used to acquire an identifier for an author and identify a domain of a particular author for any given message of an author; the email address example was presented for purposes of illustration only.

The recipient may request from the message trust service its domain certificate or site certificate in response to the message received from the author, where the message identifies the domain and correspondingly the message trust service of that domain. The recipient authenticates or verifies the domain certificate via a Certificate Authority (CA) or via cache, if a prior transaction resulted in the acquisition of the domain certificate from the CA for the domain in question. The recipient compares the acquired message trust service domain certificate against the CA acquired domain certificate and if there is a match, then explicit trust with the domain in question is established. However, the trust with the author of the message from the author is not yet established. This trust is implicitly established via interactions of the recipient and its services with the message trust service in the manners described below. In some cases, it may be that the message itself includes metadata that may include a purported domain certificate that the recipient can strip and use to compare from the CA acquired domain certificate for purposes of establishing explicit trust with the domain associated with the message of the author. It is noted that certificate chains may also be included, such that certificates may be associated with a chain and matched from the chain.

Correspondingly, the recipient becomes a requester in a transaction with the message trust service and forwards to the message trust service the identifier for the author (in the previous example this would be "Cameron").

Accordingly, at 110, the message trust service receives from the requestor (recipient of the author's original message) an identifier for the author. The identifier is used by the message trust service to traverse to a specific storage location within the domain that houses author certificates for authors of the domain. In some cases, the author certificates may be viewed as self-signed author certificates. In other cases, the author certificates may be any Pretty Good Privacy (PGP) certificate associated with the author in question.

In some embodiments, at 111, the message trust service may have previously stored an author certificate for the author in a specific storage location associated with that author. That is, at 112, the storage location may be a sub directory that is named using the author's identifier where the parent directory of the sub directory is a site or domain certificate directory. It is also noted that a sub directory may be virtual. That is, the sub directory does not have to be a static file it can be servlet or a Common Gateway Interface (CGI) that looks like or appears to be a directory to the outside world or to observers; but it may actually be a virtual directory instead and not really a static file directory as it appears to be. So, the sub directory can be static or virtual and in some cases dynamically created when requested.

It is also noted that the certificate retrieved from any sub directory or storage location may be company or enterprise specific. This allows an enterprise to just publish the domain or site certificate with its own certificate authority (CA). The author certificates may then be auto-generated and may have a chain to that enterprise's CA. In such a case, trust is still implicitly established because the enterprise's CA certificate can be self signed and was not issued by a well-known, public CA.

So, in our previous example, the message trust service processes within the Novell.com domain and receives from Lloyd (recipient or requester) or a service of Lloyd's the author identifier "Cameron." The message trust service then traverses to a directory on Novell.com, such as "/certificate/Cameron." If there is no such sub directory or storage location on Novell.com, then the message trust service may immediately notify the requestor (Lloyd in the continuing example) that the author (Cameron) cannot be authenticated or does not have an author certificate with the domain (Novell.com). If this occurs, then processing would stop and the requestor can make a determination or policy may make a determination for the requestor to not open or view the message received from the author, since implicit trust cannot be established.

As was described in our continuing example, at 113, the identifier received from the requestor may have originated as part of an email transaction that is occurring between the author and the recipient (requestor). In such a situation, an email service, or even proxy integrated with the email service of the recipient, may process the message and may interact with the message trust service in a fashion that is unbeknownst or unknown to the recipient. That is, services of the recipient may be integrated in such a fashion that the email recipient of a message from an author is unaware that the email is being processed for purposes of establishing implicit trust with the author and the message. In fact, this is typically the case when explicit trust is established for a domain of a method when a CA is consulted. Therefore, although the term requestor or recipient is used it is to be understood that the requestor or recipient may in fact be a transparent service that is integrated into the processing environment of a requestor or recipient to alter the flow of processing for received messages on the requester or recipient's end of a message transaction.

According to an embodiment, at 114, the message trust service may also be used to provide a variety of other beneficial services to both the authors of a domain to which the message trust service is associated and to recipients of messages originating from those authors. For example, the message trust service may facilitate the generation of a public and private key pair for any given author, and supply back to the author the private key portion of that pair. The public key may reside in the specific storage location associated with the author and may be supplied on demand to authorized requesters (recipients) for purposes of enhancing security through custom message encryption for messages being passed between the author and a recipient. In some cases, the message trust service may even store the private key portion of the author's private and public key pair; however, the private key is only deliverable to the author to which it relates or, if desired, to specific authorized administrators. A more complete description of this type of enhanced processing for the message trust service is described more fully below with respect to the method 200 and the FIG. 2.

At 120, the message trust service determines if a specific storage location for a received author's identifier exists. Again, if it does not exist then this is an indication that the author and the message cannot be authenticated or validated by the message trust service on behalf of the requestor. The requester may elect to adhere to this adverse advice and disregard the communication or message received from the author or may at its own peril elect to ignore the advice and open or otherwise process the message. Further, in some cases the configuration of the requestor may be such that with adverse advice the requestor is prohibited from actually processing the author's message. Any desired logging, reporting, and notifying may occur when a particular message is not capable of being authenticated by the message trust service.

In an embodiment, at 121, the processing associated with the continuing email example is depicted. That is, the message trust service may recognize the storage location as a sub directory at the domain, where the sub directory is named using the identifier of a sender in an email address of a message.

According to another embodiment, at 122, the actual path of the storage location that houses the author certificate for an author may be supplied from the requestor with the identifier. That is, the message that the recipient receives may have metadata that includes a specific path on the domain that processes the message trust service. The recipient (requestor) then forwards the path to the message trust service and the message trust service checks to see if it in fact exists and has the desired author certificate of the author in question. In this manner, the message trust service does not have to be preconfigured to know the specific storage location that houses a given author's certificate, since the author may supply that with the message to a recipient and the recipient can relay it to the message trust service. Thus, in some embodiments, the actual management of the author certificates can be done by the authors themselves as long as the path to the author certificate is within the domain of the author and accessible to the message trust service.

At 130, the message trust service returns the certificate of the author from the storage location to the requester. The requestor can then compare the potential author certificate that accompanied the original received message against what is returned from the message trust service, and if a match occurs the requestor has established implicit trust for the message and the author of the message. It is implicit because the domain processing the message trust service was verified via a CA when the message was originally received either directly of via cache and because trust is known to exist with the domain, the message trust service is trusted. The message trust service provides the author certificate that permits the requestor to further trust the author and the author's message. So, because the requestor can trust the domain and the message trust service it relies on assertions or information supplied from them to conclude that trust can be established for a given author and the author's message. Therefore, implicit trust is formed between the requestor and the author.

According to an embodiment, when retrieving any given author's public certificate, a list of certificates may actually be returned, which allows an expiring certificate to be automatically replaced with a new certificate without invalidating messages or emails that were sent by that author, but have not yet been processed by the recipients. So, this technique permits recipients to use multiple certificates associated with any given author in the event that some certificates are replaced or expired. p In some embodiments, the requestor or recipient may cache the returned author certificate for a given author and use it repeatedly for continuing transactions with that author. The author certificate may expire based on policy and when it does it will have to be reacquired from the message trust service.

In still other embodiments, the requestor may supply to the message trust service the purported certificate of the author that accompanies the message received from that author and the message trust service may do the comparison and return a valid or invalid message to the requester. Thus, the processing to compare the certificates to establish implicit trust with the author may be subsumed into features of the message trust service.

Figure 2:
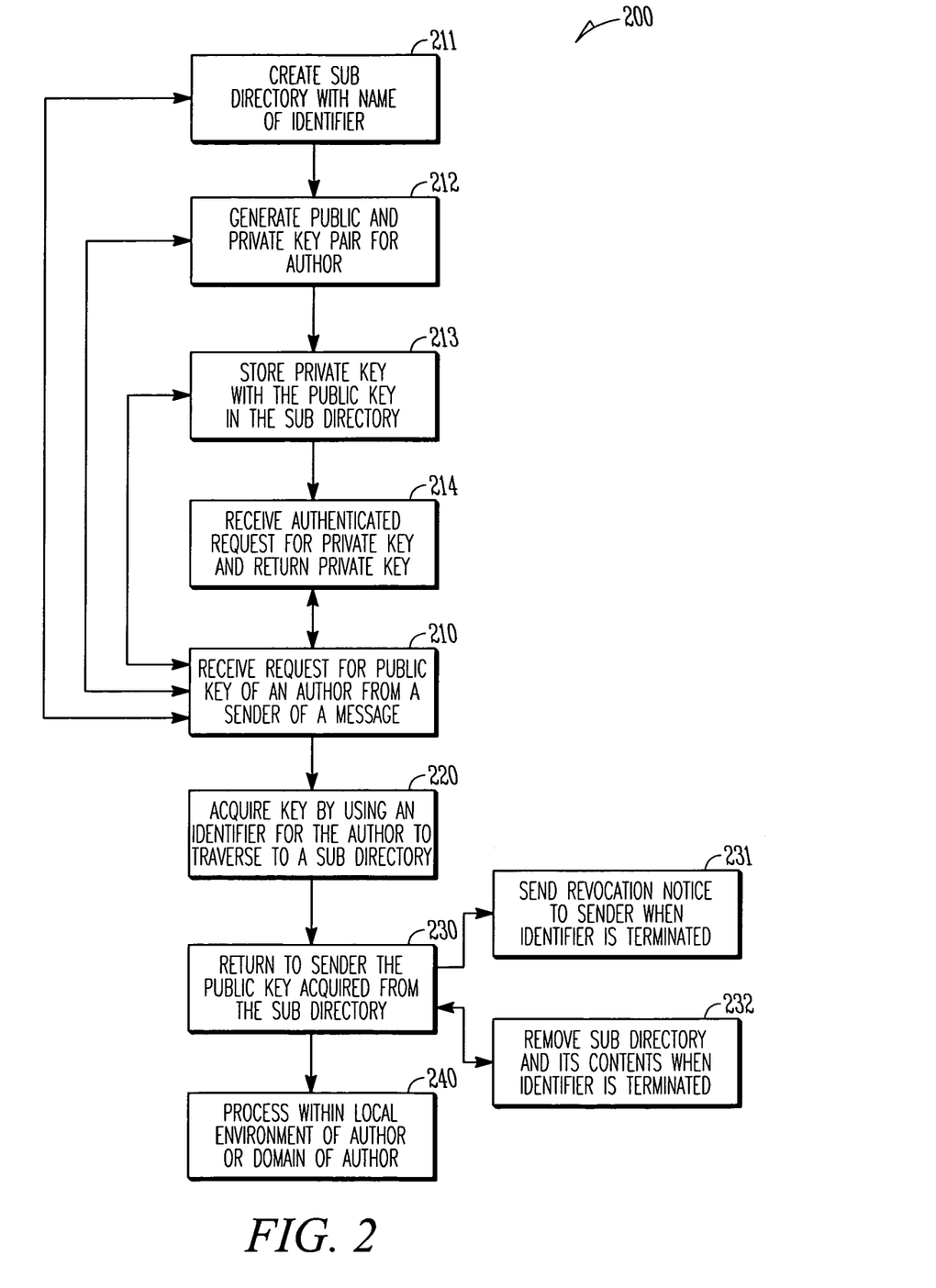
FIG. 2 is a diagram of method for facilitating secure and trusted communications, according to an example embodiment.

FIG. 2 is a diagram of method 200 for facilitating secure and trusted communications, according to an example embodiment. The method 200 (hereinafter "communication service" is implemented in a machine-accessible and readable medium and is operational over a network). The network may be wired, wireless, or a combination of wired and wireless. In an embodiment, the communication service depicts other features that the message trust service represented by the method 100 of the FIG. 1 may perform. That is, the communication service may be viewed as an enhanced version of the message trust service. It is, however, noted that the communication service may be an independent service that stands on its own and performs the processing discussed in greater detail herein and below.

In addition to a recipient of an email desiring to establish implicit trust with an author, a recipient may also desire to communicate securely with a given author. One technique for doing this is to use custom encryption for messages being sent between a recipient and a sender (author). It is again to be noted that when a recipient sends a reply to a sender of a message that the recipient becomes an author.

One technique for custom encryption is to use private and public key pairs to encrypt and decrypt messages. For example, a sender encrypts a message sent to a recipient using the recipient's public key. The recipient then decrypts the message using the recipient's private key and the sender's public key. Private keys are not shared and public keys are often selectively shared, since participants in the encryption and decryption transaction have to have their own private key and a public key for themselves and well as for the other participants. Encryption may also implement signing, such that the sender may use its private key during the encryption of the message. So, encryption and signing or just encryption or even just signing may be used for any given message.

With this context the communication service is now discussed with reference to FIG. 2. At 210, the communication service receives a request for a public key of an author from a sender of a message. In some cases, the sender may have previously been a recipient of an email from the author, such as was presented and discussed in detail above with the method 100 of the FIG. 1. However, it is noted that in some cases the sender may be originating an entirely new thread with an author, such that the sender was not necessarily a prior recipient of a message from the author. It is also understood that the sender may itself be viewed as another and different author, since the sender is forwarding a message.

At 211, and prior to receiving the request for the public key of the author, the communication service created a sub directory for housing a public key of the author in question. In some cases, that sub directory may be named using the identifier that is associated with the author in question.

Similarly, at 212, and prior to receiving the request for the public key of the author, the communication service may have generated or facilitated the generation of a public and private key pair for the author in question. It is however noted that the communication service does not have to generate or facilitate the generation of the public and private key pair, since the author may simply supply a public key to the communication service or place it in a given directory accessible to the communication service, such that the communication service is entirely unaware of the existing of the public key until it inspects the sub directory upon receiving a request from the sender.

Further, at 213, and prior to receiving the request for the public key of the author, the communication service may store the private key with the public key in the sub directory on behalf of the author. The private key does not have to be stored and may not be desirably stored in the sub directory; although it can be if desired. Of course access to the private key will be monitored and severely restricted if it is in fact stored in the sub directory with the public key. The private key should be accessible to just the author of the private key and perhaps to authorized administrators or super users.

According to an embodiment, at 214, and if the private key is stored in the sub directory, the communication service may receive an authenticated and authorized request for the private key from either the author or an authorized administrator and return that private key. This may be beneficial when the author switches to a different environment and/or uses a new processing device, such that the private key is not available to the author.

The processing depicted at 211-214 may occur in any combination, such that all may occur or any combination of some or just one may occur.

At 220, the communication service acquires the public key using an identifier for the author to traverse to the sub directory. In some cases, the sender may actually supply a full location-specific path, such that the identifier is not required in all cases to acquire the public key from a desired sub directory. So, the identifier may provide the information necessary for the communication service to locate the sub directory having the public key requested or the path that identifies the sub directory may be directly supplied by the sender. In the latter case, the sender likely acquires the path of the sub directory from prior interactions with the author for which the sender desires to now send an encrypted message.

At 230, the communication service returns to the sender the public key acquired from the sub directory. The sender then uses this public key of the author to construct a custom encrypted message that the sender transmits to the author, and when this occurs the sender becomes the author from the perspective of the recipient of the message (and the recipient was originally designated as the author from the perspective of the sender). The encryption occurs by the sender using the public key of the author to custom encrypt the message.

According to an embodiment, at 231, the communication service may send a revocation notice to the sender when the identifier associated with the author in question is terminated. In other words, the public key of the author may be revoked. This can occur for a variety of reasons, such as when the author establishes a new and different private and public key pair or such as when the author is no longer a valid user of the domain associated with the communication service. From the perspective of the communication service, this revocation can be noted and processed in a variety of automated manners.

For example, at 232, the communication service may receive some event, policy, or notice that the author is to be revoked or the public key is to be revoked. In response to this, the communication service removes the sub directory and its contents associated with the public key. The sub directory may also include a self-signed or other PGP certificate of the author, which is also be revoked.

In another case, the communication service may detect that a given public key is updated within the sub directory or removed from the sub directory altogether. In such a situation, the identifier of the author may not have been revoked but the public key is revoked, so the sub directory may not be removed but the notice to the sender may still occur on the assumption that the public key possessed by the sender is no longer valid.

In still another case, the communication service may detect that an administrator or even an author with proper permissions has entirely removed the sub directory associated with the author. In this case, any certificate associated with the author is assumed to be revoked along with the public key of the author and notification of such is sent to the sender.

So, a public key may be updated or revoked and an author certificate may be updated or revoked or both situations may occur (updates or revocations to both the author certificate and/or the public key). The communication service may handle these situations in different or same manners, such that some actions require removal of the sub directory along with notification and some actions simply require notification.

At 240, the communication service may be entirely processed as a sub service within the local environment of a given author or within a domain environment of the author. So, an enterprise may implement the communication service as a domain service for its domain that administers and manages author certificates for users of the domain and their corresponding public and/or private keys.

Figure 3:
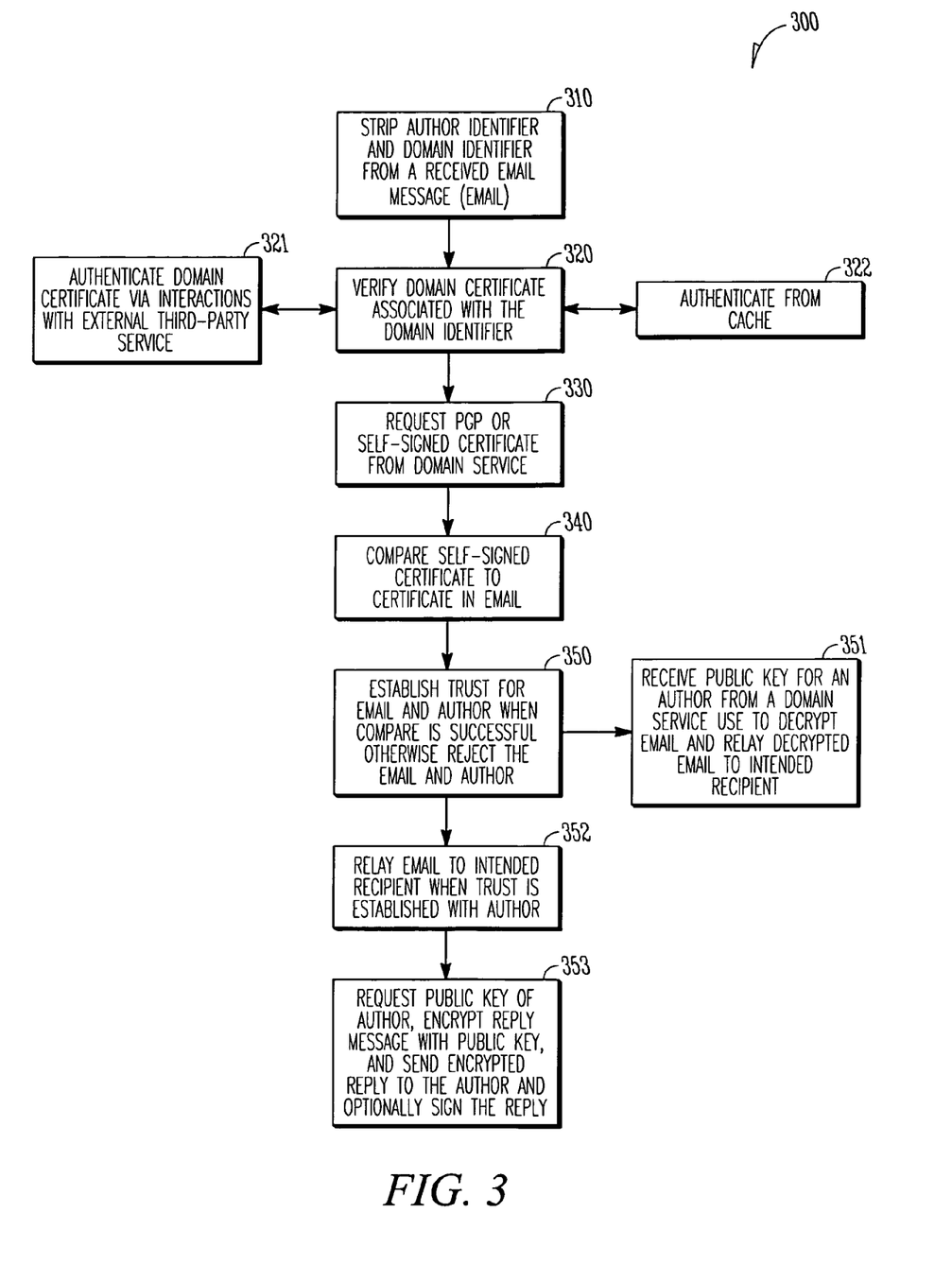
FIG. 3 is a diagram of a method for verifying trust and secure communications, according to an example embodiment.

FIG. 3 is a diagram of a method 300 for verifying trust and secure communications, according to an example embodiment. The method 300 (hereinafter "verifying service") is implemented in a machine-accessible and readable medium and is accessible over a network. The network may be wired, wireless, or a combination of wired and wireless. According to an embodiment, the verifying service represents processing associated with a recipient of a message. That is, the verifying service may process messages received from an author and interact with the message trust service and/or communication service (represented by the methods 100 and 200 of the FIGS. 1 and 2, respectively) for purposes of establishing implicit trust with the author and the messages received from the author and for purposes of custom encrypting reply communications with that author.

The automated interactions and processing performed by recipients of emails from authors are represented by the verifying service. In this manner, the verifying service interacts on behalf of a recipient with the methods 100 and 200 of the FIGS. 1 and 2. The verifying service may be implemented as an enhanced feature or sub service a recipient's existing email service or as proxy situated within the local environment of the recipient.

At 310, the verifying service, after having received a message (e.g., email, instant message, text message, etc.) from an author, strips an author identifier and a domain identifier from the message, such as from a header associated with an email or other metadata associated with the received message.

At 320, the verifying service verifies the domain certificate associated with the domain identifier. According to an embodiment, at 321, the verification may occur via interactions between the verifying service and a CA or other external third-party service trusted and independent from the domain associated with the domain identifier. Thus, a domain certificate associated with the message is compared to the domain certificate supplied on the domain's behalf from the CA or other trusted third-party and external service (external to the environment of the verifying service). In some embodiments, at 322, the verification of the domain may occur from cache associated with the verifying service and its local environment. Thus, a previous domain or site certificate for the domain in question may be cached and available for comparison from that cache.

Once the domain is independently verified or authenticated, the verifying service assumes that explicit trust has occurred or been established with that domain. Next, to enhance security for the message received, the verifying service attempts to establish implicit trust with the author of the received message. Accordingly, at 330, the verifying service requests a self-signed certificate (can also be any PGP-based certificate) of the author from a domain service located on the domain that was verified and for which explicit trust now exists. The processing associated with the domain service was described above with respect to the method 100 of the FIG. 1 and enhanced features of the processing for the domain service was described above with respect to the method 200 of the FIG. 2.

At 340, the verifying service compares the self-signed certificate returned from the domain service on behalf of the author to the certificate that the author affixed or supplied with the message. If the comparison fails, then trust cannot be established and the verifying service may use policy to determine whether the intended recipient of the message may further process the message or whether message processing is to be strictly prohibitive. Logging, reporting, and notifying may also occur when implicit trust of the author and the author's message fails.

At 350, the verifying service establishes implicit trust with the author if the comparison with the self-signed certificates is successful, otherwise the message and author are rejected as being illegitimate or potentially harmful. In an embodiment, at 351, the verifying service may request the public key of the author from the domain service and use that in combination with either a private key of the verifying service or a private key of the intended recipient to decrypt the message and to relay the decrypted version of the message to the intended recipient for viewing and processing in an unencrypted format.

At 352, the verifying service relays the message to the intended recipient when the implicit trust is established with the author. In some cases, the intended recipient may want to respond to the author and may want to utilize custom encryption for that correspondence. Thus, at 353, a public key for the author may be requested (if not previously acquired) and it may be used to encrypt the reply message and send to the author. The message may also be signed by the intended recipient of the verifying service. In fact, the message or replies may be just encrypted, just signed, or both encrypted and signed.

The processing associated with acquiring and distributing the public key of the author was discussed in detail above with respect to method 200 of the FIG. 2.

Moreover, it is noted that the intended recipient may not be aware that messages and replies are in fact being encrypted and decrypted and/or signed. This may occur when the verifying service is a transparent and hidden integrated service that acts on behalf of the intended recipient. In such a scenario the verifying service may have its own signature and public and private key pair or it may use the intended recipient's signature and public and private key pair if authorized and configured to do so.

It is noted that the methods 100, 200, and 300 of the FIGS. 1-3, respectively may be implemented as instructions and stored on machine-readable media. That media may be portable or removable and subsequently interfaced to a machine, where the instructions are uploaded and processed to perform the operations of the methods. Alternatively, the instructions may be downloaded over a network from one or more machines to a processing machine where the instructions are processed. In still other situations, the instructions may be prefabricated in storage or memory of a machine and processed. In yet other circumstances, the instructions may be assembled from a variety of different media in various combinations and processed on a machine. In some embodiments, the instructions may be processed from different media on a plurality of machines that cooperate with one another over a network (wired, wireless, or a combination of wired and wireless).

Figure 4:
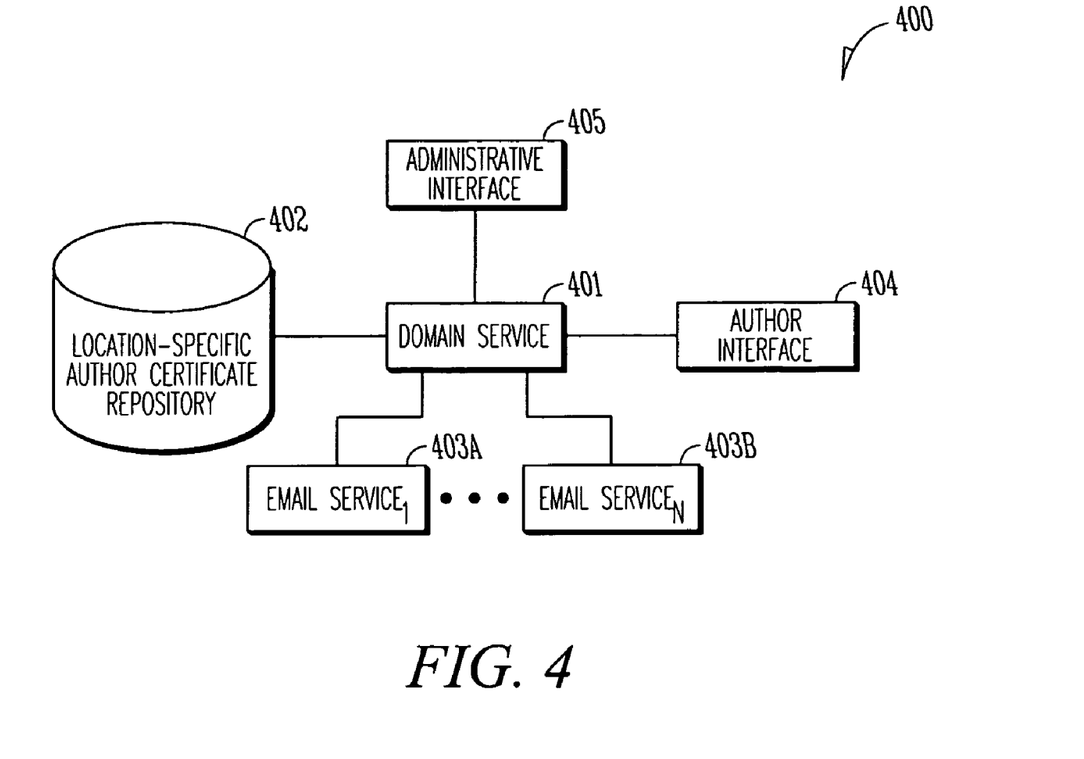
FIG. 4 is a diagram of trusted communication system, according to an example embodiment.

FIG. 4 is a diagram of trusted communication system 400, according to an example embodiment. The trusted communication system 400 is implemented in a machine-accessible and readable medium and is accessible over a network. The network may be wired, wireless, or a combination of wired and wireless. The processing of the trusted communication system 400 implements, among other things, the processing of methods 100, 200, and/or 300 depicted in the FIGS. 1-3, respectively.

The trusted communication system 400 includes a domain service 401 and a location-specific author certificate repository 402. The trusted communication system 400 may also include a plurality of message (e.g., email, instant message, text message, etc.) services 403A-403B, an author interface 404, and/or an administrative interface 405. Each of these will now be discussed in turn.

The domain service 401 and its processing were presented above in detail with respect to the methods 100 and 200 of the FIGS. 1 and 2. The domain service 401 is implemented within the domain of authors or the local environments of network service providers for the authors. In some cases, the domain service 401 may be implemented external to the domain but is in secure and trusted communication with the domain as if it were an extension of the domain.

The authors may be viewed as users of the domain to which the domain service 401 relates and processes within. The domain service 401 manages the location-specific author certificate repository 402 and supplies author certificates of the authors to requesters that have established explicit trust with the domain where the domain service 401 processes.

The domain service 401 may also be used to generate, store, and/or manage public and/or private keys associated with the authors. Techniques for achieving this were described above in detail with respect to method 200 and FIG. 2. The domain service 401 may also proactively keep track of which requestors have received author certificates and/or public keys of authors and notify them when revocations or modifications are detected.

The location-specific author certificate repository 402 (hereinafter "repository") is a storage and/or memory location that is accessible to the domain service 401. According to an embodiment, the repository 402 is a directory that includes a variety of sub directories therein, each sub directory named using an identifier associated with a particular author to whom it relates.

The repository 402 houses author certificates for authors or users of the domain being managed by the domain service 401. A specific location for each author or user is partitioned or available under the repository 402. Within each location an author certificate for a particular author is stored and perhaps even a private key associated with that particular author. The author certificates permit the domain service 401 to vouch for the authenticity of authors and the domain service 401 has an established and explicit trust relationship with requestors of the author certificates. So, the requestors assume implicit trust with authors for whom the domain service 401 supplies author certificates.

According to an embodiment, the trusted communication system 400 may also include a plurality of email or message services 403A-403B. The message services 403A-403B act on behalf of requestors or recipients of messages from authors associated with the domain. The message services 403A-403B interact with the domain service 401. The interaction may be transparent to the requestors or recipients or may be known to the requestors or recipients. Example processing associated with the message services 403A-403B were provided above with respect to the method 300 of the FIG. 3. Each requestor has its own message service 403A or 403B. Alternatively, groupings or other domains of requestors may have a single message service 403A and 403B that acts on behalf of the whole group or domain.

The message services 403A-403B maybe integrated into an email system of the recipients, accessed externally from the email system of the recipients, and/or accessed as a proxy service (transparent or forward proxy) from a local environment of a particular requester.

The message services 403A-403B acquire and compare author certificates for authors and may also decrypt and encrypt communications with authors using public keys acquired from the domain service 401 for the authors. The author certificates are also requested from the domain service 401 and acquired from the appropriate location of the repository 402.

The trusted communication system 400 may also include an author interface 404. The author interface 404 permits authors to store author certificates in the repository 402 and optionally permit the authors to generate and/or store self-generated public keys and perhaps private keys associated with the authors. The author interface 404 may also permit authors to update and remove author certificates and keys.

In some embodiments, the trusted communication system 400 may also include an administrative interface 405. The administrative interface 405 permits authorized users, such as administrators, to remove, create, and otherwise manage the contents and sub directories or locations of the repository 402. In this manner, administrators may use the administrative interface 405 to revoke author certificates of particular authors or to revoke public keys of the authors.

It is noted that a variety of other implementation techniques may be used without departing from the teachings presented herein. As one example, an identifier may be associated with an index, such that each author certificate may have its own path. So, certificate expiration and renewal may be seamless. In such embodiments, an author may also be associated with multiple identifiers and each one associated with a unique certificate. In fact, any mechanism that maps or matches an author to one or more unique certificates or chains or certificates may be used without departing from the teachings presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method for executing on a machine, comprising:
   receiving, by the machine, an identifier for an author, wherein the identifier is received from a requestor in response to an attempted communication between the author and the requestor;
   determining, by the machine, when a storage location associated with the identifier exists by traversing a directory named with the identifier, and when the storage location does not exist notifying the requestor that the author cannot be validated; and
   returning, by the machine, an author certificate of the author from the storage location, when the storage location associated with the identifier exists as the directory that is named with the identifier, wherein the author certificate is returned to the requestor and the requestor uses the author certificate to establish trust with the author for the attempted communication.

2. The method of claim 1 further comprising, storing, by the machine, the author certificate in the storage location when the storage location is created and before the identifier is received from the requestor.

3. The method of claim 2, wherein storing further includes naming the storage location using the identifier as a sub directory in a site certificate directory.

4. The method of claim 2 further comprising, generating a public key for the author and supplying a private key for the public key back to the author for subsequent use by the author.

5. The method of claim 1, wherein receiving further includes receiving the identifier from the requestor as a transaction processed by an electronic mail service of the requestor.

6. The method of claim 1, wherein determining further includes receiving the storage location as a path that is submitted by the requestor with the identifier and wherein the path is acquired by the requestor from a header associated with the attempted communication that the requestor receives from the author.

7. A machine-implemented method to execute on a machine, comprising:
   receiving, by the machine, a request for a public key of an author from a sender of a message, wherein the sender is attempting to send a custom encrypted message to the author;
   acquiring, by the machine, the public key by using an identifier for the author to traverse to a sub directory named with the identifier of the author; and
   returning, by the machine, to the sender the public key acquired from the sub directory in response to the identifier of the author.

8. The method of claim 7 further comprising processing at least one of before the request is received from the sender:
   creating, by the machine, the sub directory and naming the sub directory with the identifier;
   generating, by the machine, the public key and a private key for the author; and
   storing, by the machine, the private key with the public key in the sub directory, wherein the private key is accessible to just the author.

9. The method of claim 7 further comprising, processing, by the machine, the method as a service associated with at least one of a local environment of the author and a network domain associated with a network service provider of the author.

10. The method of claim 7 further comprising:
    receiving, by the machine, an authenticated request from the author for a private key associated with the public key; and
    returning, by the machine, the private key to the author, wherein the author uses the private key to decrypt the message from the sender when the sender encrypted the message with the public key of the author.

11. The method of claim 7 further comprising, sending, by the machine, a revocation notice to the sender when the identifier associated with the author is terminated.

12. The method of claim 11 further comprising, removing, by the machine, the sub directory and its contents when the identifier associated with the author is terminated.

13. A machine-implemented method for executing on a machine, comprising:
    stripping, by the machine, an author identifier and a domain identifier from a received electronic mail (email) message;
    verifying, by the machine, a domain certificate associated with the domain identifier;
    requesting, by the machine, a self-signed certificate for the author identifier from a domain service of a domain associated with the domain certificate and the domain identifier;
    comparing, by the machine, the self-signed certificate returned from the domain service against a message certificate accompanying the email message to authenticate an author associated with the email message;
    establishing, by the machine, trust for the email message and the author when the comparison is successful, otherwise rejecting the email message and the author associated with the email message;
    requesting, by the machine, a public key of the author from the domain service the domain service traverses to a directory named with an identifier of the author to locate the public key;
    encrypting, by the machine, a reply email message using the public key returned from the domain service; and
    sending, by the machine, the reply email message to the author.

14. The method of claim 13 further comprising, signing by the machine, the reply email message before sending to the author.

15. The method of claim 13 further comprising, relaying, by the machine, the email message to an intended recipient of the email message when the trust is established for the author.

16. The method of claim 13 further comprising:
    receiving, by the machine, a public key of the author from the domain service when trust is established;
    decrypting, by the machine, the email message using the public key of the author and a private key associated with at least one of the method and an intended recipient of the email message; and
    relaying, by the machine, the decrypted email message to the intended recipient of the email message.

17. The method of claim 13, wherein verifying further includes at least one of:
    authenticating the domain certificate through interactions with an external third-party service; and
    authenticating the domain certificate from cache, wherein the domain certificate resides in the cases as a result of a previous authentication session with the third-party service for the domain.

18. A system, comprising:
    a domain service implemented in a machine-readable medium and executed by a machine; and
    a location-specific author certificate repository implemented in a machine-readable medium and accessible via the machine, the domain service is to manage the location-specific author certificate repository having a unique storage location for each author of a domain associated with the domain service, each storage location being a directory named with a unique identifier for each author, and each storage location including an author certificate for the author for to which it relates, and wherein the domain is trusted by requestors and the author certificates are implicitly trusted by the requestors in response to the author certificates being managed and delivered from the domain service associated with the domain.

19. The system of claim 18 further comprising, a plurality of electronic mail (email) services, each email service implemented in a machine-readable medium and executing on a machine, and wherein each email service is associated with a unique one of the requestors and wherein each email service interacts with the domain service to acquire a specific one of the author certificates for a specific one of the authors for a given email transaction between the specific one of the authors and the unique one of the requestors.

20. The system of claim 19, wherein each email service is at least one of integrated into an email system, externally accessed from the email system, and accessed as a proxy service from a local environment of a particular requestor to which it is associated.

21. The system of claim 18, wherein the domain service is implemented externally from the domain or implemented within a local environment of the domain.

22. The system of claim 18 further comprising, an author interface implemented in a machine-readable medium and executed on a machine, wherein the author interface is to interact with each of the authors to acquire the author certificates.

23. The system of claim 22 further comprising, administrative interface implemented in a machine-readable medium and executed on a machine, wherein the administrative interface is to remove select storage locations and their contents for purposes of revoking select author certificates.

* * * * *